United States Patent
Li et al.

(10) Patent No.: US 10,298,442 B2
(45) Date of Patent: May 21, 2019

(54) ERROR RECOVERY PROCESS

(71) Applicant: International Business Machines Corporation, Armonk, NY (US)

(72) Inventors: Chuan Li, Shanghai (CN); Xue Qiang Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 15/277,615

(22) Filed: Sep. 27, 2016

(65) Prior Publication Data

US 2018/0091360 A1  Mar. 29, 2018

(51) Int. Cl.
| | |
|---|---|
| *G06F 11/00* | (2006.01) |
| *H04L 12/24* | (2006.01) |
| *H04L 12/26* | (2006.01) |
| *G06F 11/07* | (2006.01) |

(52) U.S. Cl.
CPC .......... *H04L 41/0654* (2013.01); *H04L 43/08* (2013.01); *G06F 11/07* (2013.01)

(58) Field of Classification Search
CPC ............. G06F 11/0793; G06F 11/0727; H04L 41/0654; H04L 47/805
See application file for complete search history.

(56) References Cited

U.S. PATENT DOCUMENTS

| | | | |
|---|---|---|---|
| 7,453,795 B1* | 11/2008 | Pan | H04L 41/0663 370/216 |
| 7,636,801 B1 | 12/2009 | Kekre et al. | |
| 7,640,451 B2 | 12/2009 | Meyer et al. | |
| 7,917,903 B2 | 3/2011 | Lumb et al. | |
| 8,230,192 B2 | 7/2012 | Balasubramanian et al. | |
| 9,176,708 B2 | 11/2015 | Gallant et al. | |
| 2003/0046396 A1* | 3/2003 | Richter | G06F 9/505 709/226 |
| 2005/0015641 A1* | 1/2005 | Alur | G06F 11/1458 714/2 |
| 2006/0112317 A1* | 5/2006 | Bartolini | H04L 41/0631 714/47.2 |
| 2009/0183024 A1* | 7/2009 | Childress | G06F 11/0709 714/4.11 |
| 2011/0320591 A1* | 12/2011 | Ozaki | H04L 41/06 709/224 |

(Continued)

OTHER PUBLICATIONS

Sangeetha Seshandri et al. "Enhancing Storage System Availability on Multi-Core Architectures with Recovery-Conscious Scheduling", https://www.usenix.org/legacy/event/fast08/tech/full_papers/seshadri/seshadri_html/index.html, Feb. 2002.

(Continued)

*Primary Examiner* — Marc Duncan
(74) *Attorney, Agent, or Firm* — Kunzler, PC

(57) ABSTRACT

Method, system and computer program product are disclosed for error recovery process. The method comprises: detecting an event of error in a computer system having a plurality of components; obtaining a QoS requirement for the event; determining a strategy for error recovery process based on the obtained QoS requirement; and executing an error recovery process for the event based on the determined strategy for error recovery process.

14 Claims, 2 Drawing Sheets

(56) References Cited

U.S. PATENT DOCUMENTS

| | | | | |
|---|---|---|---|---|
| 2013/0283088 | A1* | 10/2013 | Behrendt | G06F 11/0793 |
| | | | | 714/2 |
| 2014/0053017 | A1 | 2/2014 | Bartlett et al. | |
| 2015/0199148 | A1* | 7/2015 | Hrischuk | G06F 3/0653 |
| | | | | 711/114 |
| 2016/0026535 | A1* | 1/2016 | Bhat | G06F 11/2035 |
| | | | | 714/19 |
| 2016/0253246 | A1* | 9/2016 | Chow | G06F 11/1469 |
| | | | | 714/19 |
| 2016/0342450 | A1* | 11/2016 | Nagesharao | G06F 11/1415 |
| 2017/0168907 | A1* | 6/2017 | Harper | G06F 11/2033 |
| 2017/0251076 | A1* | 8/2017 | Bellur | H04L 67/322 |

OTHER PUBLICATIONS

Industry Perspectives, "Guaranteed Storage Performance Requires a New Approach to QoS", Data Center Knowledge, Nov. 16, 2015.
Mohammad Abdur Razzaque et al., "QoS-Aware Error Recovery in Wireless Body Sensor Networks Using Adaptive Network Coding", Sensors, www.mdpi.com/journal/sensors, Dec. 29, 2014.

* cited by examiner

ERROR RECOVERY PROCESS

BACKGROUND

Embodiments of the present disclosure generally relate to information technologies, and particularly to error recovery process.

A computer system generally includes various physical and/or virtual components, which cooperate to perform various tasks. Due to the variety of the components and the complexity of the tasks, errors that occur in the computer system are unavoidable. Solutions for error recovery process (ERP) have been provided to deal with the occurrence of error events.

SUMMARY

As one aspect of the present disclosure, there is provided a method. The method comprises: detecting an event of error in a computer system having a plurality of components; obtaining a QoS requirement for the event; determining a strategy for error recovery process based on the obtained QoS requirement; and executing an error recovery process for the event based on the determined strategy for error recovery process.

As another aspect of the present disclosure, there is provided a system. The system comprises one or more processors; a memory coupled to at least one of the processors; a set of computer program instructions stored in the memory and executed by at least one of the processors in order to perform actions of: detecting an event of error in a computer system having a plurality of components; obtaining a QoS requirement for the event; determining a strategy for error recovery process based on the obtained QoS requirement; and executing an error recovery process for the event based on the determined strategy for error recovery process.

As another aspect of the present disclosure, there is provided a computer program product. The program product comprises a computer readable storage medium having program instructions embodied therewith. The computer readable storage medium is not a transitory signal per se. The program instructions are executable by a processor to perform a method comprising: detecting an event of error in a computer system having a plurality of components; obtaining a QoS requirement for the event; determining a strategy for error recovery process based on the obtained QoS requirement; and executing an error recovery process for the event based on the determined strategy for error recovery process.

BRIEF DESCRIPTION OF THE DRAWINGS

Through the more detailed description of some embodiments of the present disclosure in the accompanying drawings, the above and other objects, features and advantages of the present disclosure will become more apparent. In the following description, the same reference generally refers to the same components in the embodiments of the present disclosure.

DETAILED DESCRIPTION

Some embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure to those skilled in the art.

Figure 1:
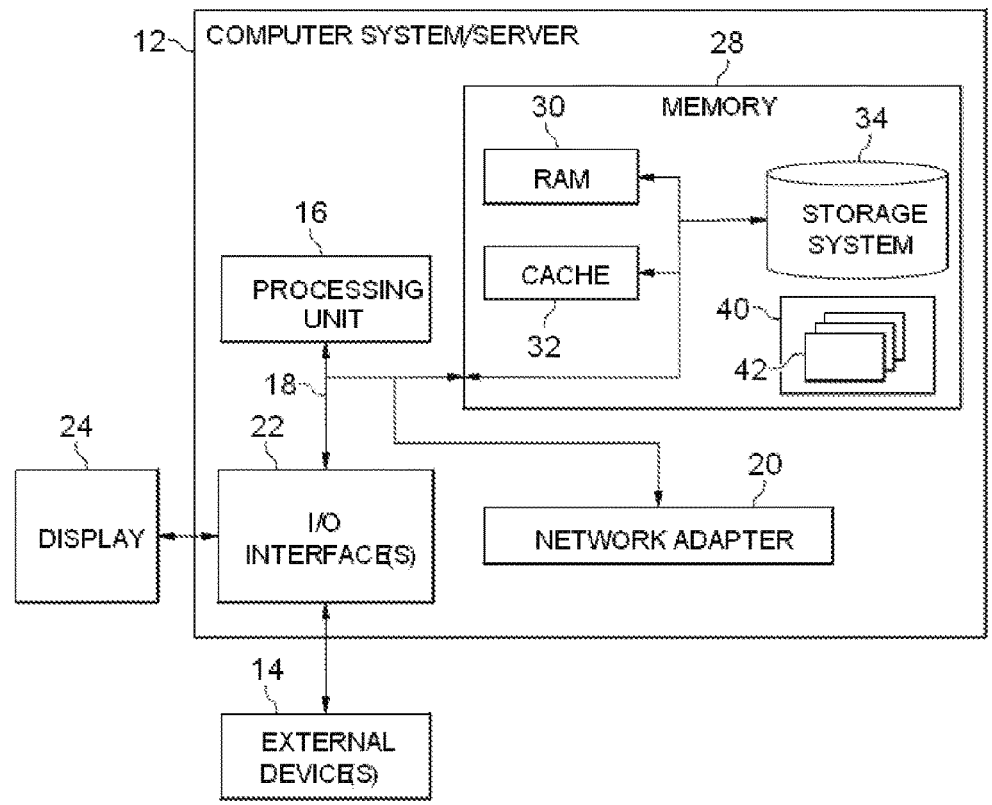
FIG. 1 shows an exemplary computer system which is applicable to implement some embodiments of the present disclosure.

FIG. 1 shows an exemplary computer system/server 12 which is applicable to implement the embodiments of the present disclosure. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The existing solutions for ERP usually apply the same strategy for the same type of events regardless of the different requirements for different users or applications. For example, when a disk in the system fails, the computer system usually holds the 10 operation for a certain period of time to wait for the disk to come back regardless which user or application uses the disk. This solution cannot satisfy the different requirements of a non-real-time application that has a low requirement for recovery time, and a real-time application that cannot tolerate a long recovery time. Therefore, it is desirable to improve the existing solutions for error recovery process. Herein, the terms, "user" and "application", are used interchangeably. They generally refer to a consumer that uses certain resource in the system and can be associated with a QoS policy (requirement) for its use of the resource.

Figure 2:
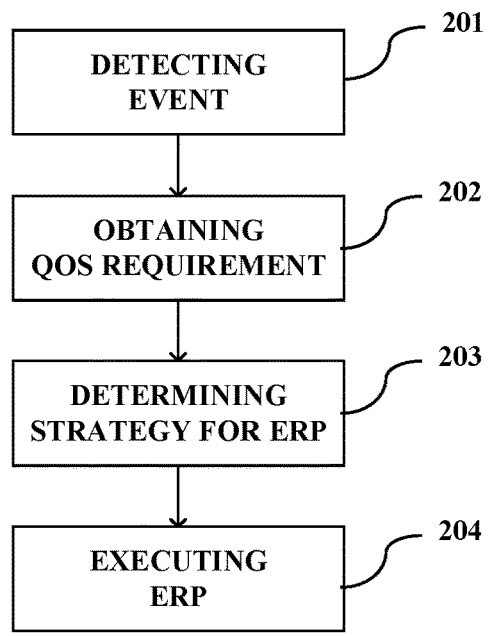
FIG. 2 is a flow chart showing a method for error recovery process according to an embodiment of the present disclosure.

FIG. 2 depicts a method for error recovery process according to an embodiment of the present disclosure. As shown in FIG. 2, the process starts at step 201, where an event of error is detected in a computer system having a plurality of components. The event of error may be any kind of failure, delay or malfunction of a component of the system that can trigger the process of ERP. Depending on the configuration of the system, the event of error may include, but not limited to, a failure, error, delay or malfunction of storage device, such as a hard disk, a random access memory (RAM), a read-only memory (ROM), an erasable programmable read-only memory (EPROM or Flash memory), a Blue-ray Disc, an optical fiber, a portable compact disc read-only memory (CD-ROM), an optical storage device, a magnetic storage device, or any combination of the foregoing. The event of error may also include, but not limited to, a failure, error, delay or malfunction of computing or controlling device, such as a CPU, a processor, an application specific integrated circuit(s) (ASICS), a controller, a server, a computer, or any combination of the foregoing. The event of error may also include, but not limited to, a failure, error, delay or malfunction of network element, such as a router, a bridge, a gateway, a terminal, a base station, a network interface card, a cable, an optical fiber, a wireless channel or any combination of the foregoing.

Then, at step 202, a QoS (quality of service) requirement for a component related to the event is obtained. It is known in the art that QoS guarantees the ability to provide different priorities or qualities to different applications or users. Depending on the affected component and the user or application that uses the component, the QoS requirement (or QoS policy) may include various dimensions or aspects. For example, for network elements, the QoS requirement may guarantee a certain level of performance to a data flow, such as, a required bit rate, delay, jitter, packet dropping probability and/or bit error rate. For storage devices, the QoS requirement may guarantee a certain level of performance, availability or other qualities.

The QoS requirement may be predefined or defined dynamically during the using of the component. The QoS requirement may comprise one element with a required value or level of quality. For example, the value or level may be "L", "M" or "H", which represent "low", "middle" or "high" in terms of performance or availability of a component in a storage system. The relationship between "L", "M" and "H" may be L<M<H. The QoS requirement may also comprise a QoS vector having a plurality of elements; an element represents a required level of QoS dimension. For example, the QoS vector may comprise an element for performance and an element for availability.

Table 1 shows a list of components related to a plurality of QoS requirements for a plurality of users respectively.

TABLE 1 a plurality of QoS requirements for a plurality of users

| Component/ Class | QoS requirement for user 1 <performance, availability> | QoS requirement for user 2 <performance, availability> | ... |
|---|---|---|---|
| Adapter | <M, M> | <M, L> | ... |
| Rank | <M, M> | <H, L> | ... |
| ... | ... | ... | ... |

Usually, a plurality of users, having different QoS requirements, can be registered in the computer system. In some embodiments of the present invention, a QoS requirement for a component is predefined for a user, and the component may be related to a plurality of QoS requirements predefined for a plurality of users respectively. Thus, it is possible that two or more QoS requirements for different users conflict with each other. For example, when there are multiple users sharing the same storage box, some of these users may have conflicting QoS requirements for the same resource. For instance, with respect to one disk, one user may need high performance but low availability, while the other may need low performance but high availability. This can be defined as follows:

against the same resource R,
there are two QoS sets named $\{Q_{00}, Q_{01}, \ldots, Q_{0n}\}$, $\{Q_{10}, Q_{11}, \ldots, Q_{1n}\}$, and at least two QoS requirements have such relationship $\{Q_{0i} > Q_{1i}\}$ AND $\{Q_{0j} < Q_{1j}\}$ According to an embodiment, the error event involves multiple users having different QoS requirements on a component and there is no conflict between the different QoS requirements. In this situation, a maximum QoS requirement among the plurality of QoS requirements for the users is obtained to help determine the ERP strategy. For example, referring to the table 1, <M, M> under user 1 will be the maximum QoS requirement for the adapter among users 1 and 2, because <M, M> is higher than <M, L>(M=M, M>L).

There may be two kinds of conflict with respect to QoS requirements in the system. They are static conflict and dynamic conflict. An example of static conflict is that two or more users define different QoS policies (conflicting requirements) against the same physical drive. This can be detected when the users define the QoS policies. On the other hand, as an example of dynamic conflict, two or more users define QoS policies against two or more different logical volumes, and later the two logical volumes share some physical space from the same physical drive. Such a dynamic conflict can be detected dynamically when the system is running.

According to an embodiment of the present disclosure, when the QoS requirement for a user conflicts with the QoS requirement for another user, the system notifies at least one of the users to change its QoS requirement so that the conflict can be solved. For example, as shown in table 1, user 1 and user 2 have conflicting QoS requirements with respect to the rank, because <M, M> conflicts with <H, L>(M<H, M>L). In this situation, the system can notify at least one of users about the conflict and ask the user to adjust its QoS requirement.

According to another embodiment of the present disclosure, when the QoS requirement for a user conflicts with the QoS requirement for another user, the system uses the QoS requirement of the user having a higher priority. For example, referring to the table 1, if user 1 has a higher priority than user 2, then the QoS requirement for the rank will be set to <M, M> for ERP strategy.

According to another embodiment of the present disclosure, when the QoS requirement for a user conflicts with the QoS requirement for another user, the system uses the QoS requirement of the user that is registered to the system earlier, namely, "first come, first serve". For example, referring to the table 1, if user 1 is registered to the system earlier than user 2, the QoS requirement for the rank will be set to <M, M> for ERP strategy.

There may be only one component related to the event. However, the computer system usually includes various physical and/or virtual components cooperating with each other, thus usually a plurality of components with different QoS requirements are related to the event. Table 2 shows an example that a plurality of components are related to the same event.

TABLE 2 a plurality of components related to the same event

| Event | Component 1 | The QoS requirement for component 1 |
| | Component 2 | The QoS requirement for component 2 |
| | Component 3 | The QoS requirement for component 3 |
| | ... | ... |

Figure 3:
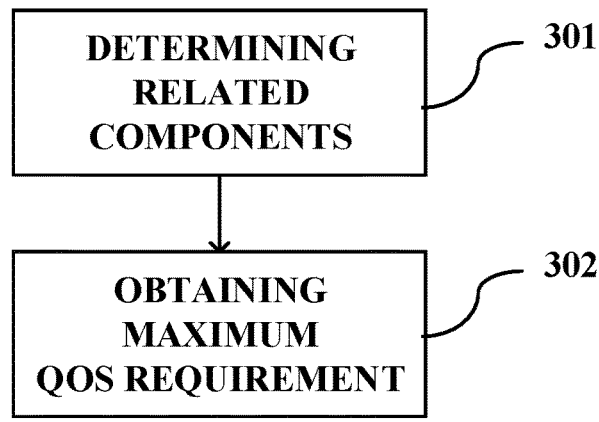
FIG. 3 is a flow chart showing the process of obtaining a QoS requirement according to an embodiment.

FIG. 3 shows the process of obtaining the QoS requirement for ERP strategy according to an embodiment. As shown in FIG. 3, first at step 301, a plurality of components related to the event are determined according to relationships among the components.

Figure 4:
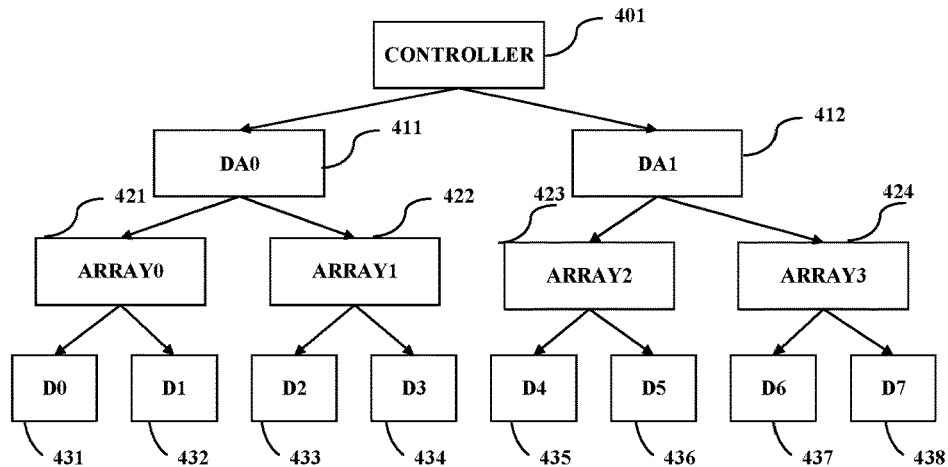
FIG. 4 shows an exemplary hierarchy of components in a storage system according to an embodiment.

As an example to show the relationships among components, FIG. 4 depicts the hierarchical structure of a storage system. As shown in FIG. 4, the controller 401 accesses the date stored on the disks (D) through the database array level (DA) and the disk array (ARRAY) level. Where an application or user accesses the data stored on D0 431 through controller 401, the related components would include controller 401, DA0 411, ARRAY0 421, and D0 431. It should be understood that the hierarchy in FIG. 4 is only exemplary, and different systems may have different relationships among their components. Various hierarchies or other structures may be used to describe the relationships among the components.

Back to FIG. 3, after determining the related components, the system obtains a maximum QoS requirement for the plurality of components at step 302. When the QoS requirement comprises a vector with a plurality of elements, the maximum QoS requirement may have the maximum element for each dimension. By obtaining the maximum QoS requirement, all the recovery requirements of the components may be fulfilled. It is noted that the conflict resolution as described in the above embodiments can also be used in this embodiment.

After obtaining the QoS requirement at step 302, the system can determine an ERP strategy based on the obtained QoS requirement. Table 3 is an exemplary table of ERP strategies according to an embodiment of the present disclosure. The table look-up operation may be advantageous in reducing time cost, thus the table of ERP strategies may facilitate the error recovery process. It should be understood, the strategy for error recovery process may also be determined by other manners, such as being decided or calculated with a processing unit based on the obtained QoS requirement.

TABLE 3 an exemplary table of ERP strategies

| Event | QoS requirement 1 | The ERP strategy for QoS requirement 1 |
| | QoS requirement 2 | The ERP strategy for QoS requirement 2 |
| | QoS requirement 3 | The ERP strategy for QoS requirement 3 |
| | ... | ... |

Further, the list may include all the possible QoS requirements to facilitate the table look-up operation. And some of the ERP strategies may be the same, even though their corresponding QoS requirements are different.

For example, the system may allow a user to define a QoS requirement having two dimensions, such as, <performance, availability> and each dimension has three levels, such as, low, medium and high. In this example, there are nine possible QoS requirements: <L, L>, <L, M>, <L, H>, <M, L>, <M, M>, <M, H>, <H, L>, <H, M>, and <H, H>. Depending on the configuration of the system and actual needs of the users, some of the possible QoS requirements may share the same ERP strategies, while the others have their own strategies. In other words, an ERP strategy may be applicable to multiple QoS requirements. The granularity may be determined by the configuration of the system and actual needs of the users.

As shown in FIG. 2, after determining the ERP strategy, the system performs the error recovery process for the event based on the determined ERP strategy at step 204.

As described above, QoS provides different priority or quality to different applications or users. The QoS requirement for a specific user/application may be different from another. In the above-described embodiments, the ERP strategies for the same type of events may be different after taking into consideration the QoS requirements for the users/applications, which use the related component. Thus, the ERP process can be improved to better serve different needs of the users and/or applications.

Below an example will be described in the context of storage system. A storage system may comprise multiple classes, such as raid adapter, rank, cache, and PPRC (peer to peer remote copy). For instance, a Rank 0x0000 may have drive disk 0, disk 1 and disk 3, and uses cache 0x0000 to temporarily hold write data. A Volume 0x0000 may be allocated from disk 0. Volume 0x0000 may also be the target of PPRC, which uses port 0x0000. A raid adapter can be used to control the disks. In this example, Volume 0x0000 has a QoS requirement <performance, availability> defined as <M, M>. The QoS requirements for other components are not defined.

Table 4 shows some exemplary ERP strategies for these classes in response to certain events. The ERP strategies can be predefined.

TABLE 4 exemplary ERP strategies

| Class of component related to event | Event | QoS requirement <Performance, Availability> | ERP strategy |
|---|---|---|---|
| Raid Adapter | One drive becomes hung | <H, M> | Trigger Rebuilding after 3 seconds without any reset |
|  |  | <L, H> | Reset the disk twice, if not come back, trigger rebuilding |
| Rank | Rank Degraded | <M, H> | Put the rank into read only mode |
|  |  | <H, L> | Still allow the write operation |
| Cache | One Rank goes into READ only mode | <L, H> | Reject IO targeted to this Rank |
|  |  | <M, M> | Destage data of other ranks in the write cache into drives and reserve more write cache for this Rank |
|  |  | <H, L> | Enlarge the total write cache to contain the write data of this rank |
| PPRC | Slowness on one link path from primary to secondary | <L, H> | Use the problematic path less and redistribute more workload to other good path |
|  |  | <M, M> | Suspend this problematic path |
|  |  | <H, L> | Suspend the whole PPRC relationship |

In the storage system, for example, an event "disk 0 is hung" is first detected. Based on the relationships among the components, the system may apply the QoS requirement of volume 0x0000 to disk 0, rank 0x0000, cache 0x0000, and port 0x0000. As explained above, volume 0x0000's QoS relies on disk 0, rank 0x0000, cache 0x0000, and port 0x0000. In order to achieve volume 0x0000's QoS, the same (or above) QoS level should be applied to disk 0, rank 0x0000, cache 0x0000, and port 0x0000.

After obtaining the QoS requirement, the system determines an ERP strategy based on the QoS requirement, for example, by using a look-up table like table 4. For instance, with respect to the event "disk 0 is hung" (i.e., "One drive becomes hung" in the table 3), the strategy "Trigger Rebuilding after 3 seconds without any reset" is chosen, because <H, M> is higher than <M, M>. Then, the system performs the ERP process according to the strategy "Trigger Rebuilding after 3 seconds without any reset".

During the execution of "trigger rebuilding after 3 seconds without any reset", another event "Rank Degraded" may be triggered. For this event, the strategy "put the rank into read only mode" corresponding to the <M, H> is determined. As result, another ERP process will be executed accordingly.

Similarly, the system may perform other ERP processes, such as "destage data of other ranks in the write cache into drives and reserve more write cache for this Rank" and "suspend this problematic path" in turn. Table 5 shows the event chain in the forgoing example.

TABLE 5 an exemplary event chain

| Class | Component | Event | ERP<M, M> |
|---|---|---|---|
| Raid Adapter | Disk 0 | One drive becomes hung | Trigger Rebuilding after 3 seconds without any reset |
| Rank | Rank 0x0000 | Rank Degraded | Put Rank into Read Only mode |
| Cache | Cache 0x0000 | One Rank goes into READ only mode | Destage data of other ranks in the write cache into drives and reserve more write cache for this Rank |
| PPRC | Port 0x0000 | Slowness on one link path from primary to secondary | Suspend this problematic path |

In the above example, the computer system comprises a data storage system having one or more adapters, ranks, caches and PPRCs. However, this is only exemplary; the computer system may also comprise a network system having a plurality of network elements or any other system.

Figure 5:
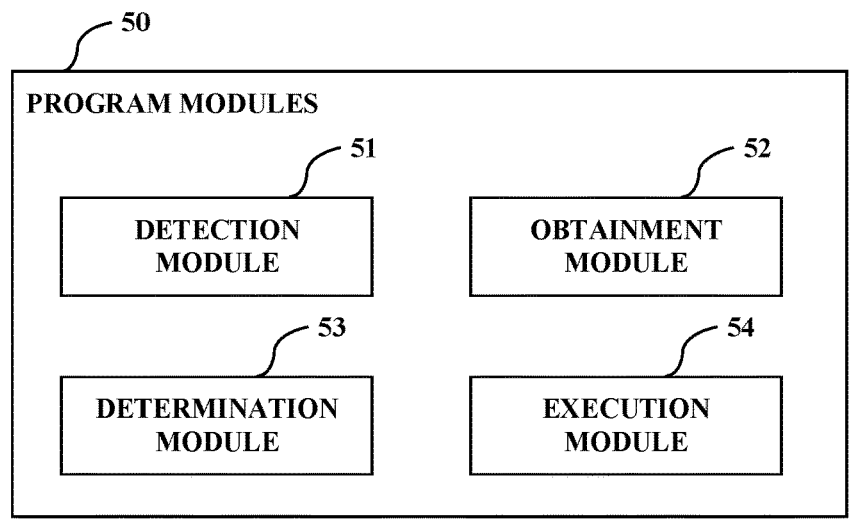
FIG. 5 is a block diagram showing a system for error recovery process according to an embodiment.

FIG. 5 shows an exemplary block diagram of program modules of a system according to an embodiment of the present disclosure. The system comprises a computer device having a processor and a tangible storage device; and a program embodied on the storage device for execution by the processor. The program has a plurality of program modules. The program modules 50 includes: a detection module 51 configured to detect an event in a computer system having a plurality of components, an obtainment module 52 configured to obtain a QoS requirement for a component related to the event, a determination module 53 configured to determine a strategy for error recovery process based on the obtained QoS requirement, and an execution module 54 configured to execute an error recovery process for the event based on the determined strategy for error recovery process.

The strategy for error recovery process for the same event in the computer system may be changed based on the obtained QoS (quality of service) requirement. Therefore, different recovery requirements of the users and/or applications may be fulfilled respectively.

Further, the obtainment module 52 may be configured to determine a plurality of components related to the event according to relationships among the components, and to obtain a maximum QoS requirement for the plurality of components. Therefore, all the recovery requirements of the components may be fulfilled by using the maximum QoS requirement for the plurality of components.

Further, the relationships among the components may comprise a physical hierarchy and/or virtual hierarchy. Therefore, both physical and virtual relationships among the components may be considered during the ERP.

Further, the QoS requirement for a component may comprise a QoS vector having a plurality of elements, an element represents a required level of QoS dimension. The system may further comprise a definition module configured to define a plurality of strategies for error recovery process based on the QoS vector. For example, the QoS vector may comprise an element for performance and an element for availability. Therefore, the QoS requirement may be comprehensive and objective.

Further, the computer system may comprise a data storage system having one or more adapters, ranks, caches and PPRCs. Or, the computer system may comprise a network system having a plurality of network elements.

Further, a QoS requirement may be predefined for a user, the component may be related to a plurality of QoS requirements predefined for a plurality of users respectively, the obtainment module 52 may be configured to obtain a maximum QoS requirement among the plurality of QoS requirements for the users. When the QoS requirement for a user conflicts with the QoS requirement for another user, at least one of the users is notified. When the QoS requirement for a user conflicts with the QoS requirement for another user, the QoS requirement of the user with a higher priority may be obtained. Alternatively, when the QoS requirement for a user conflicts with the QoS requirement for another user, the QoS requirement of the user registered to the system earlier may be obtained.

According to another embodiment of the present disclosure, there is provided a program product. The program product comprises a computer readable storage medium having program instructions embodied therewith. The computer readable storage medium is not a transitory signal per se. The program instructions are executable by a processor to perform a method comprising: detecting an event in a computer system having a plurality of components; obtaining a QoS requirement for a component related to the event; determining a strategy for error recovery process based on the obtained QoS requirement; and executing an error recovery process for the event based on the determined strategy for error recovery process.

Further, the step of obtaining a QoS requirement may comprise determining a plurality of components related to the event according to relationships among the components, obtaining a maximum QoS requirement for the plurality of components.

Further, the relationships among the components may comprise a physical hierarchy and/or virtual hierarchy. The QoS requirement for a component may comprise a QoS vector having a plurality of elements, an element represents a required level of QoS dimension. The method may further comprise: defining a plurality of strategies for error recovery process based on the QoS vector.

Further, the QoS vector comprises an element for performance and an element for availability. The computer system may comprise a data storage system having one or more adapters, ranks, caches and PPRCs. The computer system may also comprise a network system having a plurality of network elements.

Further, a QoS requirement may be predefined for a user, the component may be related to a plurality of QoS requirements predefined for a plurality users respectively. The step of obtaining may comprise: obtaining a maximum QoS requirement among the plurality of QoS requirements for the users. When the QoS requirement for a user conflicts with the QoS requirement for another user, at least one of the users may be notified. When the QoS requirement for a user conflicts with the QoS requirement for another user, the QoS requirement of the user with a higher priority may be obtained. Alternatively, when the QoS requirement for a user conflicts with the QoS requirement for another user, the QoS requirement of the user registered to the system earlier may be obtained.

As described above, it is provided in the present disclosure a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    detecting an event of error in a computer system having a plurality of components;
    obtaining a QoS requirement for the event, wherein obtaining the QoS requirement for the event comprises:
        determining one or more components related to the event according to relationships among the one or more components; and
        obtaining a maximum QoS requirement for the one or more components;
        wherein the relationships among the one or more components comprise a physical hierarchy, a virtual hierarchy, or a combination thereof;
    determining a strategy for error recovery process based on the obtained QoS requirement; and
    executing an error recovery process for the event based on the determined strategy for error recovery process.

2. The method according to claim 1, wherein the QoS requirement comprises a QoS vector having a plurality of elements, an element represents a required level of QoS dimension, and the method further comprises:
    defining a plurality of strategies for error recovery process based on the QoS vector.

3. The method according to claim 2, wherein the QoS vector comprises an element for performance and an element for availability.

4. The method according to claim 1, wherein the computer system comprises a data storage system having an adapter, rank, cache, PPRC, or some combination thereof.

5. The method according to claim 1, wherein a QoS requirement is predefined for a user, the one or more components are related to a plurality of QoS requirements predefined for a plurality of users respectively, the step of obtaining comprises:
    obtaining the maximum QoS requirement among the plurality of QoS requirements for the users.

6. A system comprising:
    one or more processors;
    a memory coupled to at least one of the processors;
    a set of computer program instructions stored in the memory and executed by at least one of the processors in order to perform actions of:
        detecting an event of error in a computer system having a plurality of components;
        obtaining a QoS requirement for the event, wherein obtaining the QoS requirement for the event comprises:
            determining one or more components related to the event according to relationships among the one or more components; and
            obtaining a maximum QoS requirement for the one or more components;
            wherein the relationships among the one or more components comprise a physical hierarchy, a virtual hierarchy, or a combination thereof;
        determining a strategy for error recovery process based on the obtained QoS requirement; and executing an error recovery process for the event based on the determined strategy for error recovery process.

7. The system according to claim 6, wherein the QoS requirement comprises a QoS vector having a plurality of elements, an element represents a required level of QoS dimension, and the actions further comprise:
  defining a plurality of strategies for error recovery process based on the QoS vector.

8. The system according to claim 7, wherein the QoS vector comprises an element for performance and an element for availability.

9. The system according to claim 6, wherein the computer system comprises a data storage system having an adapter, rank, cache, PPRC, or some combination thereof.

10. The system according to claim 6, wherein a QoS requirement is predefined for a user, the one or more components are related to a plurality of QoS requirements predefined for a plurality of users respectively, the action of obtaining further comprises:
  obtaining the maximum QoS requirement among the plurality of QoS requirements for the users.

11. A computer program product, comprising a computer readable storage medium having program instructions embodied therewith, wherein the computer readable storage medium is not a transitory signal per se, the program instructions executable by a processor to perform a method comprising:
  detecting an event of error in a computer system having a plurality of components;
  obtaining a QoS requirement for the event, wherein obtaining the QoS requirement for the event comprises:
    determining one or more components related to the event according to relationships among the one or more components; and
    obtaining a maximum QoS requirement for the one or more components;
    wherein the relationships among the one or more components comprise a physical hierarchy, a virtual hierarchy, or a combination thereof;
  determining a strategy for error recovery process based on the obtained QoS requirement; and
  executing an error recovery process for the event based on the determined strategy for error recovery process.

12. The computer program product according to claim 11, wherein the QoS requirement comprises a QoS vector having a plurality of elements, an element represents a required level of QoS dimension, and the method further comprises:
  defining a plurality of strategies for error recovery process based on the QoS vector.

13. The computer program product according to claim 12, wherein the QoS vector comprises an element for performance and an element for availability.

14. The computer program product according to claim 11, wherein a QoS requirement is predefined for a user, the one or more components are related to a plurality of QoS requirements predefined for a plurality of users respectively, the step of obtaining comprises:
  obtaining the maximum QoS requirement among the plurality of QoS requirements for the users.

* * * * *